United States Patent [19]

Wollbrinck et al.

[11] Patent Number: 5,405,484

[45] Date of Patent: Apr. 11, 1995

[54] TIRE BUILDING DRUM

[75] Inventors: James H. Wollbrinck, Murfreesboro, Tenn.; Yuichiro Ogawa, Kodaira, Japan

[73] Assignee: Bridgestone/Firestone, Inc., Akron, Ohio

[21] Appl. No.: 215,841

[22] Filed: Mar. 22, 1994

[51] Int. Cl.⁶ .......................................... B29D 30/24
[52] U.S. Cl. .................................. 156/416; 156/415; 156/401; 156/403
[58] Field of Search ............... 156/398, 401, 403, 415, 156/416

[56] References Cited

U.S. PATENT DOCUMENTS

| | | | |
|---|---|---|---|
| 3,111,443 | 11/1963 | Vanzo et al. | 156/401 |
| 3,237,199 | 2/1966 | Brey | 156/398 |
| 3,645,826 | 2/1972 | Henley et al. | 156/401 |
| 4,010,058 | 3/1977 | Kubinski et al. | 156/415 |
| 4,226,656 | 10/1980 | Appleby et al. | 156/132 |
| 4,239,579 | 12/1980 | Felten et al. | 156/398 |
| 4,244,770 | 1/1981 | Shichman et al. | 156/398 |
| 4,290,472 | 9/1981 | Bryant | 156/416 |
| 4,302,274 | 11/1981 | Enders | 156/401 |
| 4,683,021 | 7/1987 | Stalter et al. | 156/403 |
| 4,976,804 | 12/1990 | Kneip | 156/401 |
| 5,223,074 | 6/1993 | Miyanaga | 156/398 |
| 5,232,542 | 8/1993 | Norjiri | 156/417 |
| 5,273,599 | 12/1993 | Adachi | 156/403 |

*Primary Examiner*—Michael W. Ball
*Assistant Examiner*—Sam Chuan Yao
*Attorney, Agent, or Firm*—David A. Thomas

[57] ABSTRACT

A tire building drum has a pair of drum sections axially movable along a center shaft which form an internal tire inflation chamber for inflating the carcass of a green tire when mounted between the drum sections. Each of the drum sections has a plurality of bead lock segments controlled by a plurality of straight links moved by an annular piston. The piston is mounted in an annular cylinder surrounded by an annular manifold ring, an annular sealing ring and an annular bladder ring. The annular manifold provides for the distribution of pressurized air to various components of the drum and functions as an air seal for the tire inflation chamber. A plurality of air passages are formed in the manifold ring and connect to a source of pressurized air for supplying the control air from a remote source to an inflation turn-up bladder mounted on each of the drum sections and to a control assembly mounted within each of the drum sections for actuating the bead lock segments. A plurality of flexible air lines extend through the tire inflation chamber exteriorly of the center shaft, between the spaced manifold rings. Preferably, thirty-six bead lock segments are provided at each drum assembly to provide an increased holding force for clamping carcass plies-against a pair of bead ring assemblies during inflation of the green tire. The bead lock segments also provide space for the passage of the air lines extending between the two drum sections.

19 Claims, 8 Drawing Sheets

TIRE BUILDING DRUM

BACKGROUND OF THE INVENTION

1. Technical Field

The present invention relates to tire building equipment and in particular to a tire building drum having increased bead holding capacity, increased sealing of the internal tire inflation chamber, and a drum more easily maintained and adaptable for different bladder configurations.

2. Background Information

Tire building drums have been used for many years in the manufacture of green tires. Many such drums consist of a pair of movable end drum sections, with or without a stationary central section, on which the various tire components or plies are laid in a layered relationship. After the plies are placed about the drum, a pair of bead ring assemblies are brought into position and retained about the ply ends by expandable bead locks. Next, inflatable turn-up bladders turn the edges of the plies at the drum ends over onto themselves to encase the bead ring assemblies within the carcass of the green tire. These tire building drums have a variety of constructions, certain of which are set forth in various prior art patents described later below.

One of the important features of a tire building drum is the ability to clamp the ply ends against the bead ring assemblies during inflation of the green tire and during inflation of the turn-up bladders when turning the ply ends upon themselves and around the bead ring assemblies. Sufficient strength must be applied to prevent the body ply ends from slipping during expansion of the tire in order to provide for a uniform high-quality green tire carcass.

The green tire carcass also must be inflated on the drum, which is generally accomplished by forming an internal tire inflation chamber on the inside of the drum which is in communication with the interior of the green tire. It is critical to maintain an efficient air seal for this tire inflation chamber to ensure that the correct pressure is exerted on the green tire carcass and maintained thereon during the turn-up operation on the ply ends. It is also desirable that when using a pair of turn-up bladders that they inflate generally simultaneously after the expansion of the spaced pair of bead lock assemblies.

The prior art and the features thereof, which applicant believes is of interest with respect to the present invention, is set forth in the following patents.

U.S. Pat. No. 3,237,199 discloses a tire building apparatus having a substantially T-shaped bead register segment of the general type of the present invention.

U.S. Pat. No. 3,645,826 discloses a tire building drum using an annular bladder support and clamp ring, which are secured to a carrier to which the bladders are secured. The bladder support has openings with air supply pipes for inflation of the bladders.

U.S. Pat. No. 4,226,656 discloses a tire building assembly wherein the turn-up bladder has clamping means to secure it to the drum, and the bead lock assembly is actuated by a pneumatic piston arrangement. Edges of the turn-up bladders are clamped by clamp rings, and compressed air is delivered into a cylinder which causes movement of a piston which moves struts that move the bead seating ring outwardly-into clamping engagement with the bead ring.

U.S. Pat. No. 4,239,579 discloses a tire building drum using a pneumatic piston arrangement to expand the bead seating segments. The turn-up bladder is supported by the interaction of a space ring, support ring, and a drum extension.

U.S. Pat. No. 4,244,770 discloses a tire building drum having both inboard and outboard dual bladder turn-up assemblies and radially expanding bead locks. The dual bladder turn-up assemblies are positioned at the exterior of the drum, and a pair of annular elastic bead locks are formed from rings. The annular rings have a T-shaped configuration which support side plates.

U.S. Pat. No. 4,290,472 discloses a tire building drum utilizing ply turn-up bladders and bead lock clamping members, together with bead lock clamp members which are positioned at the inner ends of a body portion of the drum segments. Straight links are utilized to join an inner leg to a piston which is actuated when air is introduced into cylinders to cause the pistons and link to move axially outward so that the bead lock clamping members retract.

U.S. Pat. No. 4,302,274 discloses a tire building drum having inner and outer annular bladders with embedded flanged inserts positioned in the bladder. An outer support ring and cylinder are radial supports for the bladder, and air supply tubes are attached to a branch connection for uniform delivery of inflating air to the bladder. O-rings are provided to form seals with the branch fitting.

U.S. Pat. No. 4,976,804 discloses a tire building drum utilizing bottom and top turn-up bladders. A bladder support cylinder has air passages which allows air to be delivered to the bladders at each end of the drum. Furthermore, links connect a hub portion and the end portions of the drum segments for expanding the end portions outwardly.

U.S. Pat. No. 5,223,074 discloses a bead locking apparatus for a tire building drum in which an elastic ring is fitted in an annular recess formed in the outer periphery of an annular arrangement of segments. A segment drive device moves the bead support segments radially outwardly. Another device is provided for radially expanding the elastic ring independent of the segments. The bead is first locked by the elastic ring, and then secondarily locked by the support segments.

U.S. Pat. No. 5,232,542 discloses a tire building drum having an axially sliding body having a plurality of tapered segments. The body is moved along the drum for expanding and contracting an outer segment for affecting the diameter of the drum.

Although the above patents disclose some of the individual features and modes of operation of the present invention, none of the patents, individually or when combined, show the particular arrangement of elements of the improved tire building drum of the present invention.

SUMMARY OF THE INVENTION

Objectives of the invention include providing an improved tire building drum which has an annular manifold ring which provides an annular seal for the tire inflation chamber formed within the drum interior, and which is in fluid communication with the bead lock cylinders for retraction of the bead locks, and which also provides an annular seal with an annular bladder ring, which provides for the inflation of the turn-up bladders.

A further objective of the invention is to provide such a tire building drum in which pressurized air delivery piping is provided between a pair of drum end sections by flexible tubing which extends through the interior of the drum but is located exteriorly of the center shaft of the tire building drum, on which shaft the two drum ends are axially movably mounted.

A still further objective of the invention is to provide such an improved tire building drum which is provided with a plurality of bladder inflation air lines, some of which extend between a pair of spaced bladders for generally simultaneously inflating the spaced bladders, and for actuating the bead lock segments.

Another objective of the invention is to provide an improved tire building drum in which a plurality of straight links are provided between the bead lock cylinders and the bead lock ring for ease of expansion and contraction of the bead lock rings, and in which a relatively large number of T-shaped bead lock shoes or segments are provided, thereby increasing the holding power between the bead lock shoes and the bead ring assemblies for clamping the ply ends therebetween and to provide space for the pressurized air tubing to extend between the shoes.

A still further objective of the invention is to provide such a tire building drum which is of a sturdy and durable construction, which enables maintenance to be performed easily on the drum, and which enables rapid changeover to different sizes of bead assemblies without affecting the internal components of the drum.

These objectives and advantages are obtained by the improved tire building drum of the present invention, the general nature of which may be stated as including a pair of drum sections mounted on a central shaft, at least one of which is movable in an axial direction between inward and outward positions; a tire inflation chamber formed between the drum sections when said drum sections are in the inward position; each of said drum sections including: a bead lock assembly for gripping a bead assembly mounted about ends of a carcass ply supported by said drum section; control means for actuating the bead lock assembly; an inflatable bladder expandable between a collapsed position and an expanded position for turning up the ends of the carcass ply about the bead assembly; and an annular manifold ring for sealing an end of the tire inflation chamber and for distributing pressurized air from a supply of said air to each of the bladders and to the control means of the bead lock assembly.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
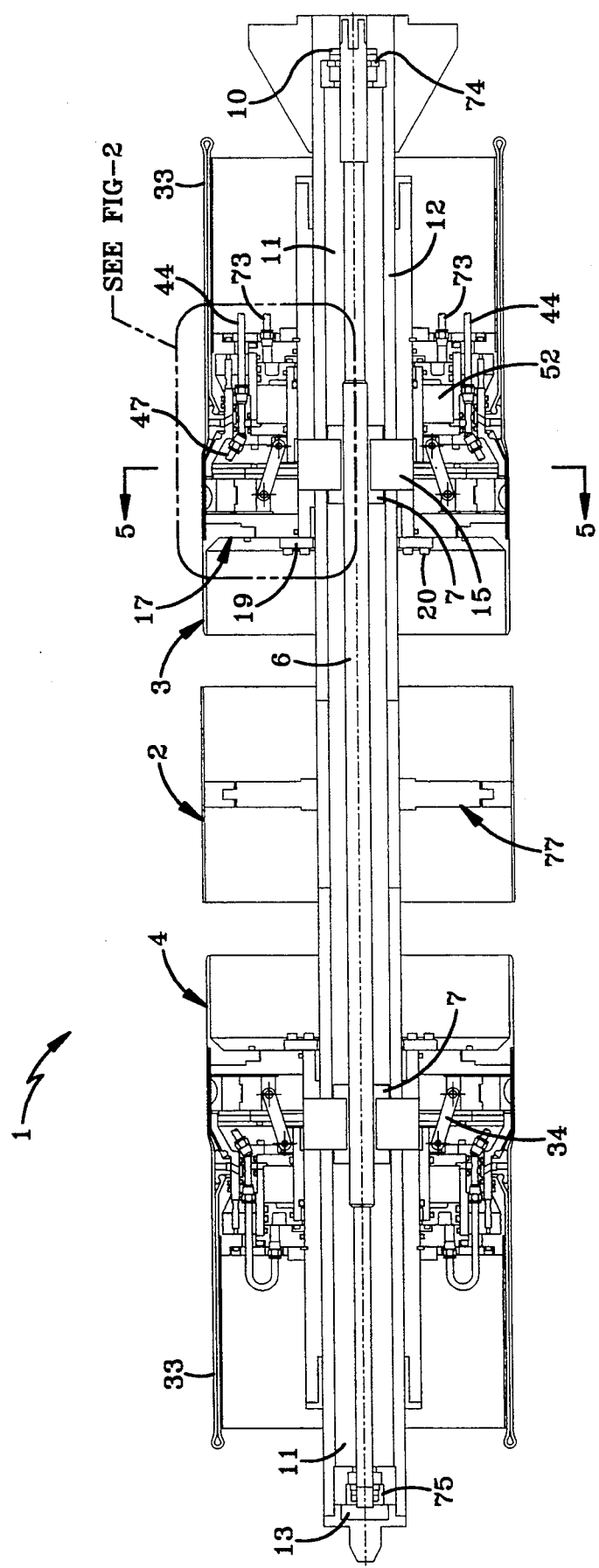
FIG. 1 is a diagrammatic longitudinal sectional view of the improved tire building drum, with the turn-up bladders shown in deflated condition, and with the two drum end sections being in their outward axial position.
Figure 2:
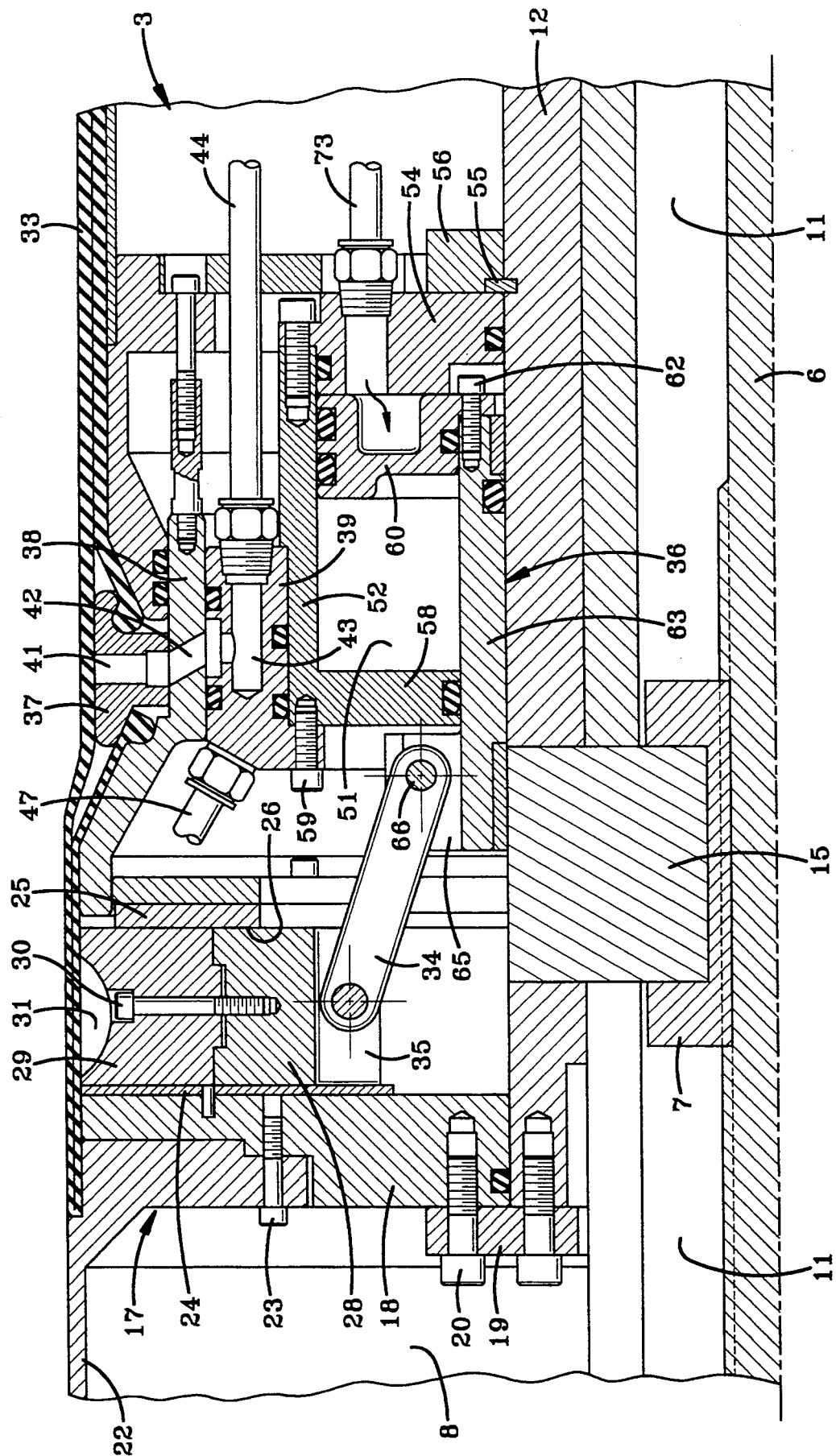
FIG. 2 is an enlarged fragmentary sectional view of the encircled portion of FIG. 1 showing the air passages within the air manifold of the right-hand side in communication with the turn-up bladder.
Figure 3:
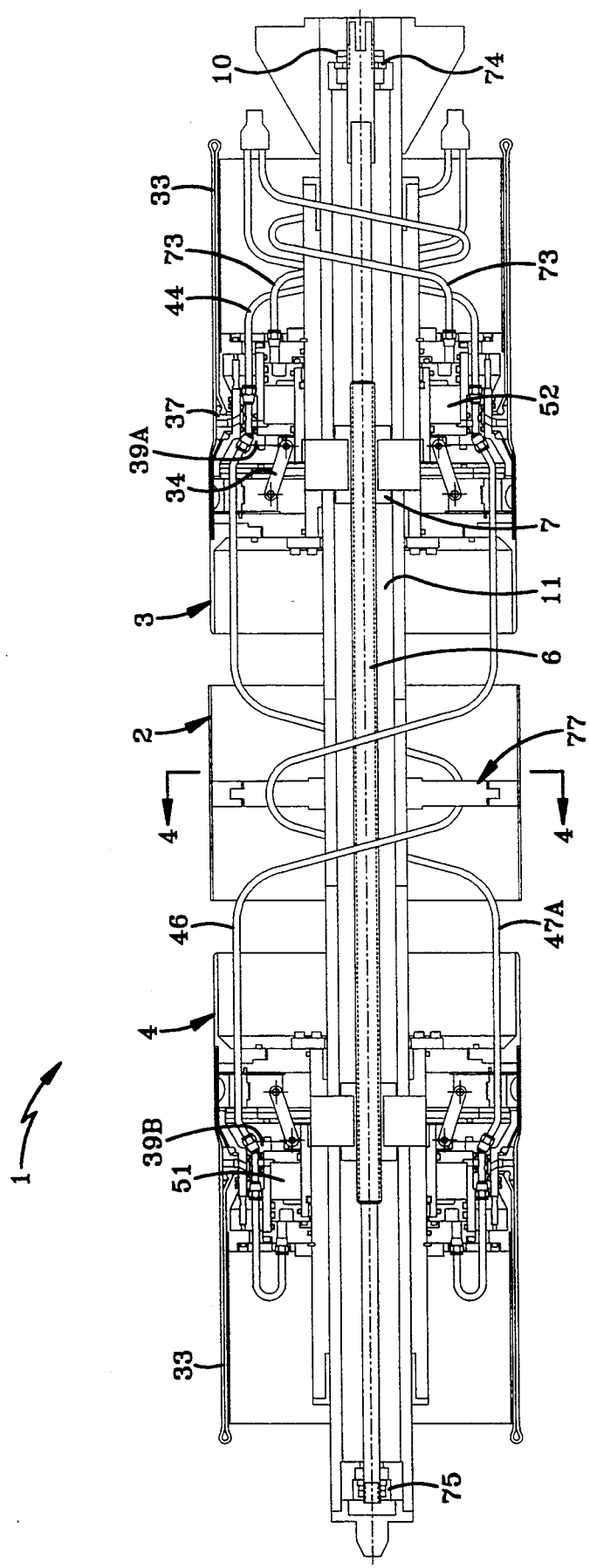
FIG. 3 is a view similar to FIG. 1 showing a portion of the air control lines extending through the interior of the drum.

The main components of the improved tire building drum, which is indicated generally at 1, are shown particularly in FIGS. 1, 2 and 3. Tire drum 1 includes a fixed intermediate drum section 2, and a pair of movable end sections 3 and 4 which are generally similar to each other. Therefore, only the right-hand drum section 3 is described in detail and is shown particularly in FIGS. 2-3, except for those differences described in further detail below.

Drum sections 3 and 4 are movably mounted on a center shaft 6, which in the preferred embodiment is a ball screw, and are moved axially therealong by follower nuts 7, between an open position of FIGS. 1 and 3 and a closed position 1A. In the closed position of 1A, drum sections 3 and 4, together with fixed intermediate section 2, form an internal tire inflation chamber 8. Chamber 8 is formed principally within the interior of intermediate drum section 2 and provides for inflating a green tire carcass 9, which is shown mounted thereon in FIG. 1A, by an incoming pressurized fluid, shown by arrows A. The pressurized fluid is supplied from a remote source (not shown) and enters through an inlet coupling 10, or similar mechanism, mounted on the right-hand end of drum 1 adjacent shaft 6. The incoming fluid, which is generally air, moves through an annular air flow chamber 11 which is formed between center shaft 6 and an outer annular carriage plate 12 which extends generally throughout the axial length of tire drum 1. The left-hand end of annular air chamber 11 is closed by an air seal 13.

Many of the principal features of the invention are shown particularly in FIGS. 2 and 3. As shown in FIGS. 2 and 3, movable drum section 3, as well as drum section 4, is mounted on center shaft 6 by slide block nut 7, which is connected by an annular key 1! 5 to annular carriage plate 12. Each drum section includes a bead lock assembly, indicated generally at 17 (FIGS. 2A and 2B), which includes a main annular support plate 18. Plate 18 is secured to annular carriage plate 12 by an annular attachment plate 19 and a plurality of circumferentially spaced bolts 20.

Drum section 3 further includes a cylindrical upper deck 22 on which the tire plies are laid, which is mounted by a plurality of circumferentially spaced bolts 23 to a stepped area of main support plate 18. An annular bearing plate 24 is mounted on an annular outboard surface of support plate 18, and in combination with a spaced parallel annular bearing plate 25, forms a plurality of radially extending slots 26 for the sliding reciprocal movement of a corresponding number of bead lock ring segments 28.

Figure 2A:
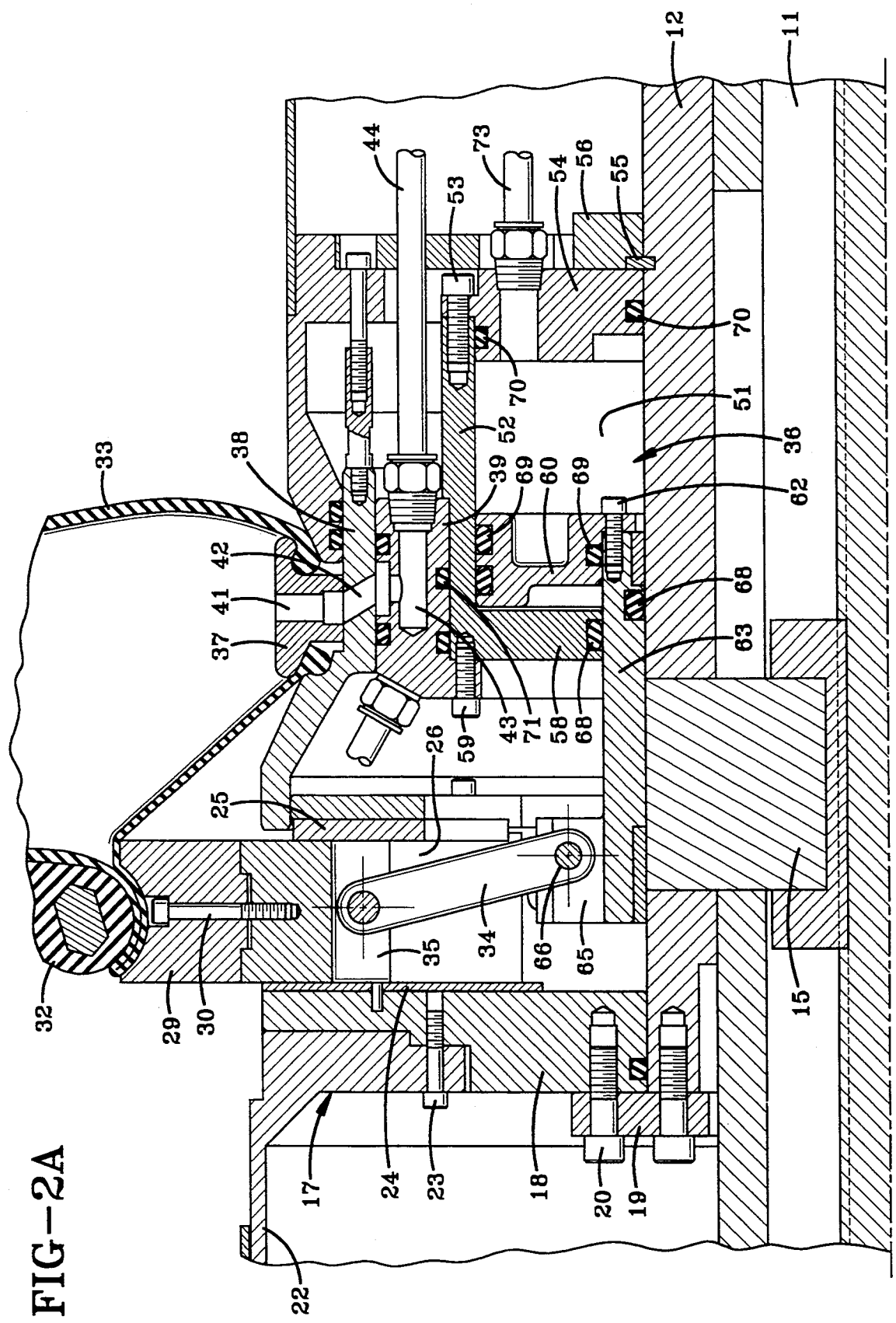
FIG. 2A is an enlarged fragmentary sectional view similar to FIG. 2, of the encircled portion of FIG. 1A.

A generally T-shaped bead lock shoe 29 (FIGS. 2, 2A and 5) is attached to each of the bead lock ring segments 28 by a bolt 30, and is formed with a concave top groove 31 for the subsequent engagement and seating of a tire bead assembly 32 therein, as shown in FIG. 2A, when the bead lock ring segments are in the expanded position.

In accordance with another feature of the invention, a pair of rigid straight control links 34 is pivotally connected to a follower block 35, one of which is mounted on the inner end of each bead lock ring segment 28. Links 34 impart radial reciprocal movement on each bead lock shoe 29 for movement between the retracted position of FIG. 2 and the expanded position of FIG. 2A, when actuated by a bead lock control mechanism which is indicated generally at 36.

An annular bladder ring 37 is concentrically mounted on an annular seal ring 38 which, in turn, is concentrically telescopically mounted on an annular manifold ring 39 (FIGS. 2 and 2A). Where necessary for clarity the right and left side manifold rings are designated as 39A and 39B, respectively. Bladder ring 37 is formed with a plurality of circumferentially spaced radially extending air passages 41, each of which communicates with an aligned air passage 42 formed in seal ring 38 at selected locations about their circumference for inflating a usual turn-up bladder 33.

Figure 4:
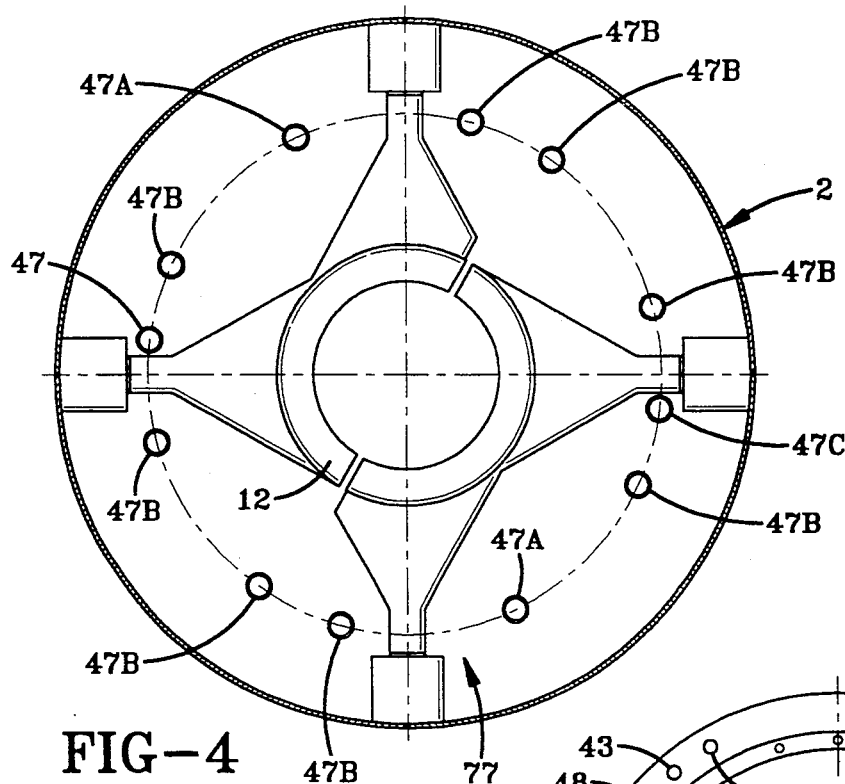
FIG. 4 is an enlarged fragmentary sectional view looking in the direction of arrows 4—4, FIG. 3.

In accordance with one of the main features of the invention, manifold ring 39A is formed with a plurality of circumferentially spaced, generally L-shaped air passages 43, each of which communicates with air passages 41 and 42, and with an incoming fluid supply line 44 for inflating bladder 33, as shown in FIGS. 2 and 2A. In the preferred embodiment eight passages 43 are formed in the right side manifold ring 39A, best illustrated in FIG. 4A. Another series of circumferentially spaced, axially extending air passages 45 are formed completely through manifold ring 39A as shown in FIG. 2B, each of which communicates with an incoming fluid supply line 46 and an outgoing fluid supply line 47. Referring again to FIG. 4A, eight of these through passages which are designated as 45A, are formed in manifold 39A and communicate with L-shaped air passages 43 formed in the left side manifold ring 39B (FIG. 4B) for inflating the left side turnup bladder 33. Two of these through passages 45B (FIG. 4A) communicate with manifold ring 39B by outlet tubes 47A (FIGS. 3 and 4) and then with the control means for the left hand bead lock assembly for retracting the bead lock segments as described more fully below. Still two other through passages 45C (FIG. 4A) communicate through manifold ring 39B with the control means for actuating the bead lock segments to move the segments radially outwardly as shown in FIGS. 2 and 2A.

Figure 2C:
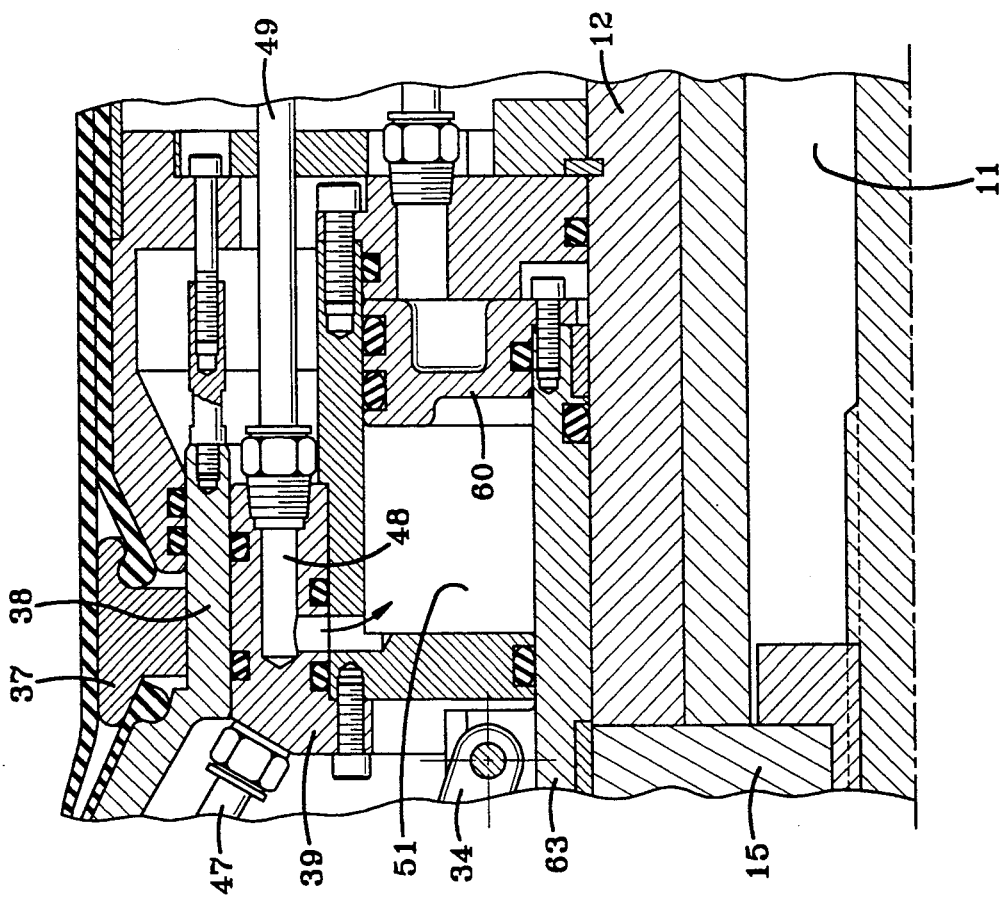
FIG. 2C is a fragmentary sectional view similar to FIGS. 2, 2A and 2B at a different orientation, showing the air flow passages of the manifold ring in communication with the cylinder of the bead lock assembly control piston.
Figure 2B:
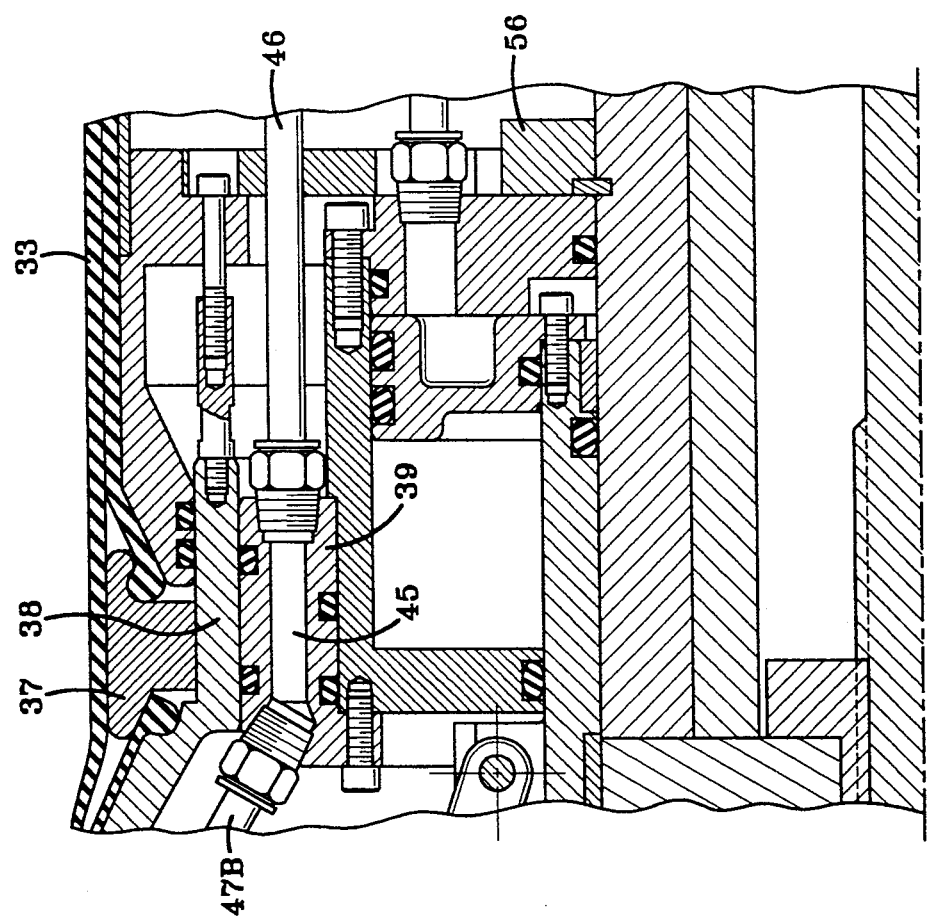
FIG. 2B is a fragmentary sectional view similar to FIGS. 2 and 2A at a different orientation, showing the air flow passages extending through the manifold ring for communication with the manifold ring on the left side of the drum.
Figure 4A:
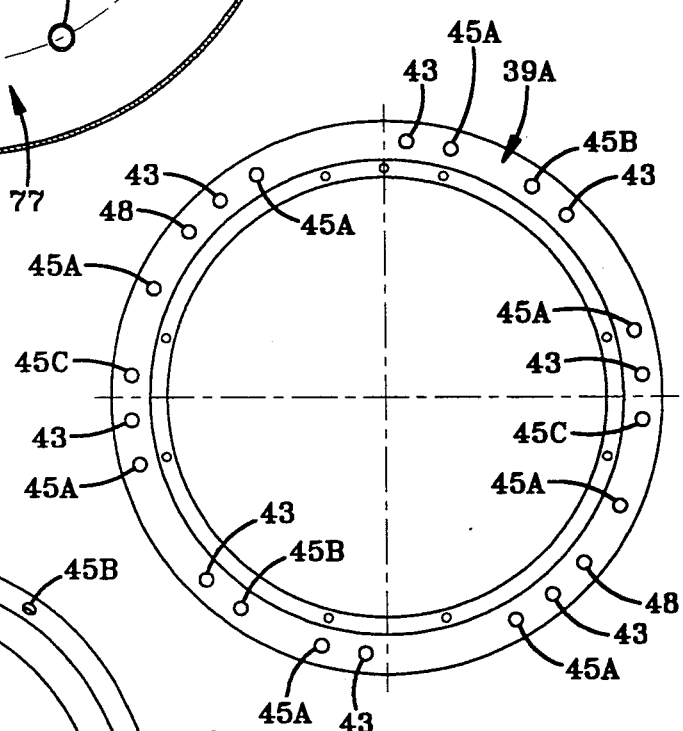
FIG. 4A is an end elevational view of the manifold ring of the right drum section, as shown in FIGS. 1-3.
Figure 4B:
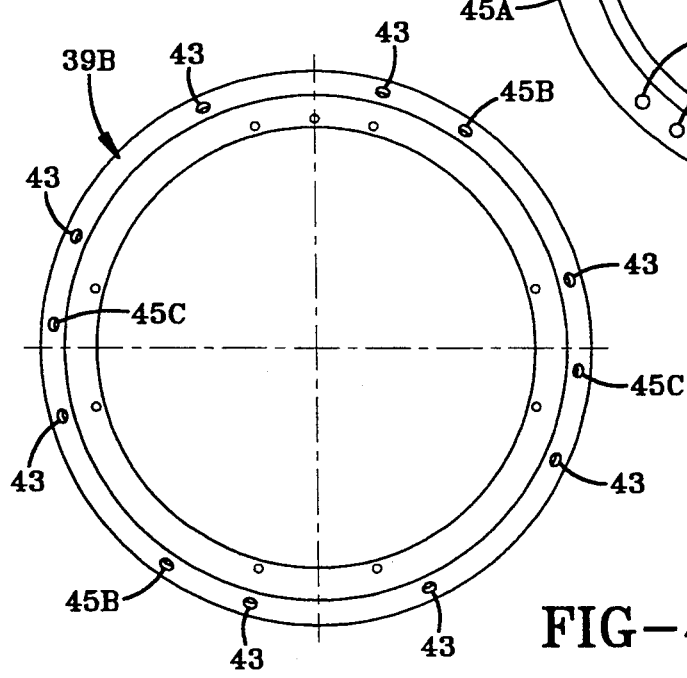
FIG. 4B is an end elevational view of the air manifold ring on the left drum section, as shown in FIGS. 1-3.

Referring to FIGS. 2C and 4A, two L-shaped air passages 48 are formed in manifold ring 39A and communicate with incoming air supply lines 49 for controlling bead lock control mechanism 36. Bead lock control mechanism 36 includes an annular cylinder 51 (FIGS. 2-2C) formed by annular carriage plate 12 and a radially spaced axially extending annular plate 52 which is connected by bolts 53 to a radially extending annular end cap 54 which is mounted on carriage plate 12 by a key 55 and an end lock ring 56. The inward end of annular cylinder 51 is enclosed by an annular radially extending plate 58 which is integral with plate 52, and which is secured by bolts 59 to manifold ring 39.

An annular piston 60 is slidably movably mounted for axial movement within cylinder 51, and is connected by bolts 62 to an annular slide ring 63. A plurality of link blocks 65 are mounted on the inward end of slide ring 63 and are pivotally connected at 66 to the inward ends of links 34. A plurality of O-rings 68 (FIG. 2A) are mounted between slide ring 63 and carriage 12 and between annular plate 58 to provide a sliding air seal therebetween. A plurality of O-rings 69 are mounted on annular piston 60 to provide a seal with annular plate 52 and with slide ring 63. Likewise, a plurality of O-rings 70 are mounted between cylinder cap 54 and carriage 10 and between plate 52, with additional O-rings 71 being mounted in complementary-shaped grooves formed in annular manifold ring 39 to provide for an air seal with annular plate 52 and seal ring 38.

The operation of improved tire drum 1 is set forth below. A plurality of usual tire carcass plies are laid about drum sections 2, 3 and 4 followed by the axial placement of a pair of bead assemblies 32 concentrically over the ply ends. Bead lock assembly 17 initially is in the position shown in FIG. 2 wherein bead lock shoes 29 are in their radial inward retracted position. Air is introduced into cylinder 51 through a plurality of air inlet lines 73 which moves piston 60 axially inwardly from the position of FIG. 2 to that of FIG. 2A. Piston 60 moves annular slide ring 63 inwardly moving links 34 and correspondingly bead lock ring segments 28 and shoes 29, radially outwardly to the position of FIG. 2A where they will grip the bead assemblies. Generally simultaneously with the introduction of pressurized air through air inlet lines 73, air is supplied to cylinder 51 on the left side drum section through two air supply lines 46 which communicate between manifold ring 39A and 39B.

Figure 1A:
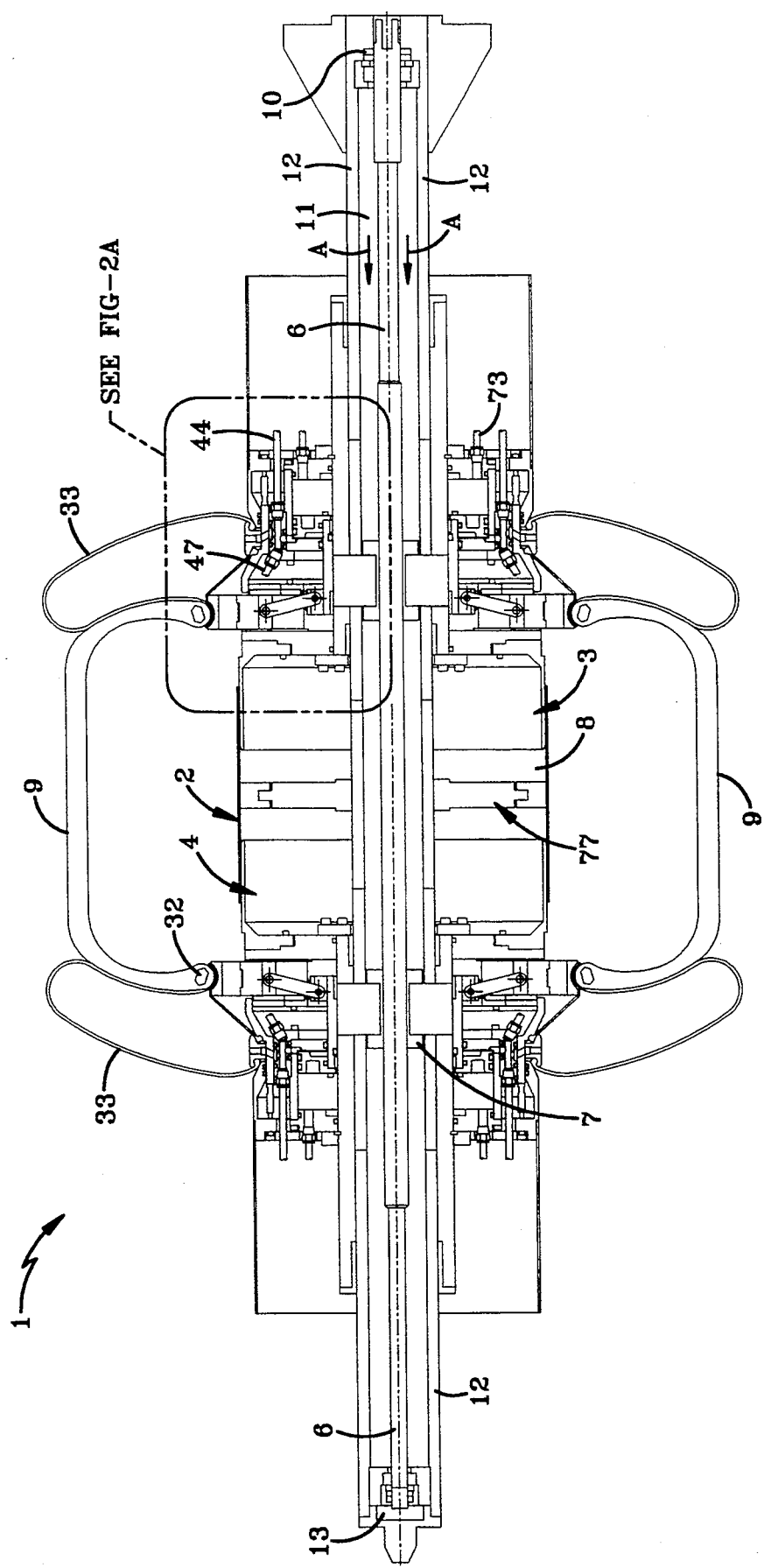
FIG. 1A is a view similar to FIG. 1, showing a green tire mounted on the drum and being inflated into a toroidal shape and the ply ends being turned upon themselves by the inflated turn-up bladders, with the two drum end sections being in their inward axial position.

As shown, lines 46 and 47A extend through inflation chamber 8 which is formed when drum sections 3 and 4 are moved inwardly to the position of FIG. 1A. In accordance with one of the main features of the invention, air lines 46 and 47A are located exteriorly of the center shaft 6 and annular air chamber 11 but within the drum interior. Furthermore, these air supply lines are formed of flexible tubing and thus can be positioned easily within the drum interior.

Next in the operation of drum 1, tire inflation air enters inflation chamber 8 through a control valve 74 and annular air chamber 11 and inflates the tire outwardly as shown in FIG. 1A generally simultaneously with the inward movement of end drum sections 3 and 4. Air chamber 8 is sealed by the spaced pairs of annular seal rings 38, manifold rings 39 and annular plates 58 of the bead lock control cylinders.

Next, bladder inflation air is supplied through incoming fluid supply lines 44 and through air passages 41, 42 and 43 as shown in FIG. 2, for inflating right side turnup bladder 33. Inflation air is supplied simultaneously through manifold ring 39A and air tubes or lines 47B into left side manifold ring 39B and through its corresponding L-shaped air passages 43 to inflate the left side turnup bladder 33. Again, air lines 47B are formed of flexible tubing and extend through the tire inflation chamber 8 exteriorly of the center control shaft and the annular air supply chamber 11. The inflation of bladders 33 will turnup the carcass ply ends in the usual manner around bead assemblies 32.

The turnup bladders are deflated by shutting off the incoming air and by the use of usual quick exhaust valves (FIG. 3) will exhaust the bladder inflation air. Pressurized air is then supplied to manifold ring 39A through incoming lines 49 (FIG. 2C) which directs the air into control cylinder 51 moving piston 60 from its forward position of FIG. 2A to its retracted position of FIG. 2C, which retracts with it bead lock segments 28 and shoes 29 through the action of links 34. Generally simultaneously with this operation, the tire inflation air is exhausted through quick exhaust valves 75 enabling the tire to be removed from drum 1.

Piston retracting air is also supplied through passages 45 of right side manifold ring 39A and through two air lines 47C to the bead lock assembly control means for retracting the bead lock ring segments and shoes in a similar manner as described above with respect to the right side bead lock assembly. Again, the flexible tubing extends through the air inflation chamber within the interior of the tire building drum but exteriorly of center shaft 6. The various air lines extending from the right side manifold ring 39A to left side manifold ring 39B extend through a center mounting flange or plate 77 (FIGS. 1 and 4) which spaces and secures the various air lines in their desired position to prevent them from becoming tangled as the two end drum sections move axially inwardly and outwardly with respect to center drum section 2.

Figure 5:
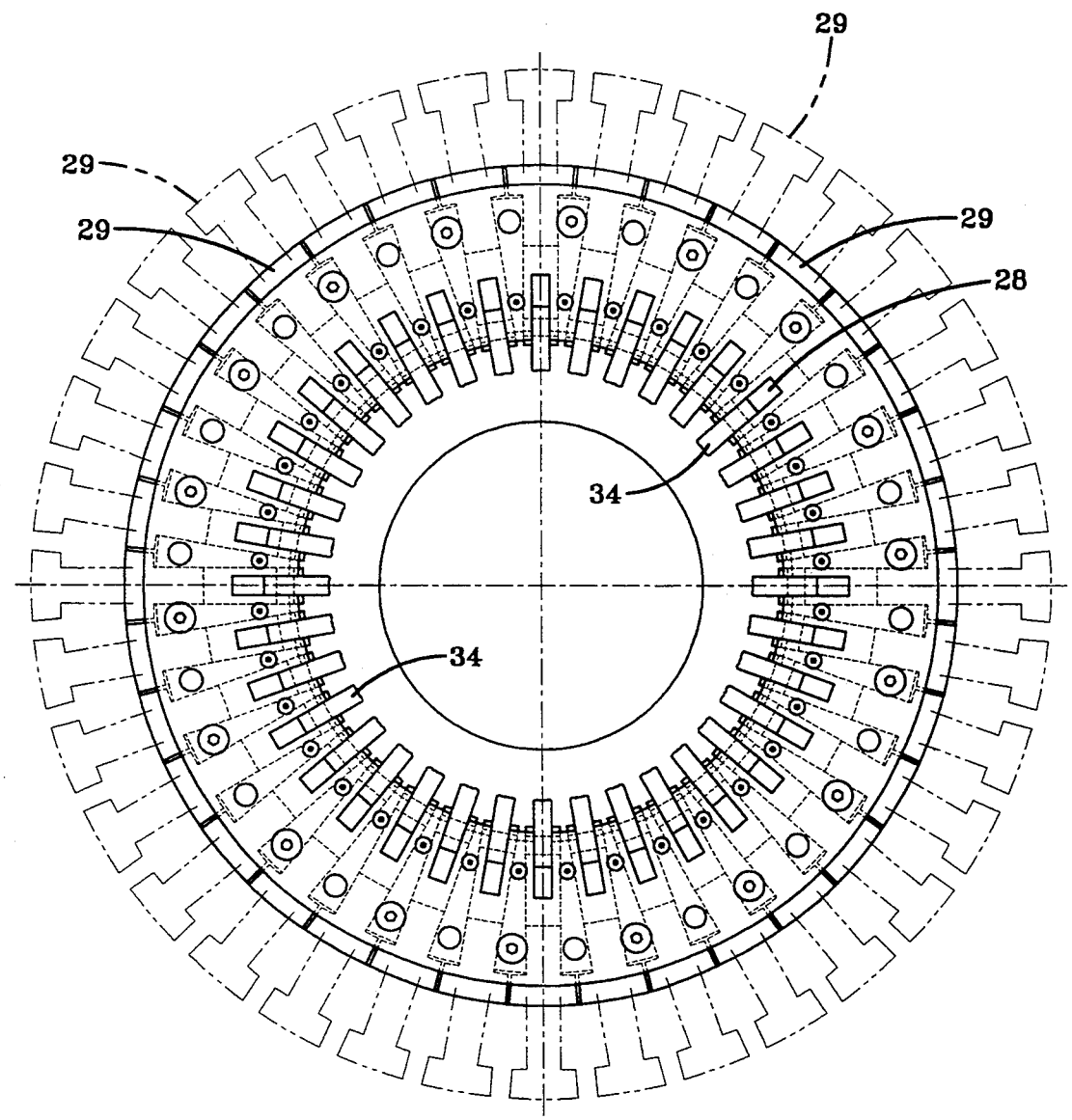
FIG. 5 is an enlarged fragmentary sectional view taken on line 5—5, FIG. 1, showing the bead lock assembly.

Another feature of the invention is shown in FIG. 5 in which 36 bead lock ring segments 28 and shoes 29 and corresponding link pairs 34, are utilized for securely gripping and holding a bead assembly during tire inflation and bladder turnup. This enables the various air lines to pass between the segments when extending between the right and left side air manifold rings. Furthermore, the vast number of bead lock shoes provide increased holding power than that believed possible with prior art bead lock shoes, which usually would be comprised of eight shoes.

The improved tire drum of the present invention, in addition to providing the increased holding power on the bead assemblies, by the use of 36 bead lock ring segments and shoes 29, use a straight linkage 34 which provides for an increased mechanical advantage for movement of the ring segments and shoes outwardly and inwardly. Furthermore, air manifold rings 39 provide=for the distribution of incoming air for bladder inflation for both drum sections as well as for the distribution of actuating air for moving the right side piston to its retracted position and for moving the left side piston both into its retracted and actuating positions. Furthermore, air manifold rings 39 provide a seal for the tire inflation chamber, which heretofore has been difficult to achieve.

Accordingly, the improved tire drum is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved tire drum is constructed and used, the characteristics of the construction, and the advantageous, new and useful results obtained; the new and useful structures, devices, elements, arrangements, parts and combinations, are set forth in the appended claims.

We claim:

1. A tire building drum for assembling tire components comprising:
   a pair of drum sections mounted on a central shaft, at least one of which is movable in an axial direction between inward and outward positions;
   a tire inflation chamber formed between the drum sections when said drum sections are in the inward position;
   each of said drum sections including:
      a bead lock assembly for gripping a bead assembly mounted about ends of a carcass ply supported by said drum section;
      control means for actuating the bead lock assembly;
      an inflatable bladder expandable between a collapsed position and an expanded position for turning up the ends of the carcass ply about the bead assembly; and
      an annular manifold ring for sealing an end of the tire inflation chamber and for distributing pressurized air from a supply of said air to each of the bladders and to the control means of the bead lock assembly.

2. The tire building drum defined in claim 1 in which each of the manifold rings is formed with a plurality of circumferentially spaced air passages, with certain of said air passages communicating with the inflatable bladder.

3. The tire building drum defined in claim 2 in which certain other of the manifold ring air passages communicate with the bead lock assembly control means for controlling the movement of said bead lock assembly.

4. The tire building drum defined in claim 2 in which a plurality of bladder inflation air lines extend through the tire inflation chamber between the manifold rings of the pair of drum sections to provide for the flow of air between the bladders of each drum section.

5. The tire building drum defined in claim 2 in which each of the drum sections further includes an annular outer bladder ring and a concentrically located inner seal ring, said seal ring mounted concentrically on the manifold ring; and in which air passages are formed in the seal ring and bladder ring and communicate with the manifold ring for supplying air into the bladder.

6. The tire building drum defined in claim 1 in which the bead lock assembly includes a plurality of radially expandable bead lock segments, and a plurality of control link means operatively connected to the bead lock segments; and in which the control means move said bead lock segments between expanded and retracted positions.

7. The tire building drum defined in claim 6 in which the control means for the bead lock assembly includes an annular cylinder and a piston reciprocally mounted therein.

8. The tire building drum defined in claim 7 in which each of the control link means is a plurality of spaced pairs of straight rigid links.

9. The tire building drum defined in claim 7 in which each of the manifold rings is formed with a plurality of air passages; and in which certain of the manifold ring air passages communicate with the annular cylinder for actuating the piston to move the bead lock segments from the expanded position to the retracted position.

10. The tire building drum defined in claim 9 in which a plurality of air supply lines communicate with each of the cylinders of the bead lock control means for moving the pistons in an axial direction to move the bead lock segments in an outward radial direction through the control links.

11. The tire building drum defined in claim 5 in which a plurality of O-rings are mounted between the manifold ring and the seal ring, and between the seal ring and the bladder ring to prevent the escape of air from the tire inflation chamber.

12. The tire building drum defined in claim 7 in which the annular cylinder of the bead lock assembly control means is formed between a pair of spaced radially extending annular plates and a pair of radially spaced axially extending inner and outer annular plates which extend between said radially extending annular plates.

13. The tire building drum defined in claim 12 in which O-rings are mounted between the manifold ring and the outer axially extending annular plate of the bead lock assembly control cylinder.

14. The tire building drum defined in claim 1 in which each of the drum sections includes an annular carriage; and in which said carriage is movably mounted on the central shaft for axial movement therealong.

15. The tire building drum defined in claim 14 in which air passage means is formed between the drum section carriages and the central shaft for supplying air into the tire inflation chamber.

16. The tire building drum defined in claim 15 in which a plurality of bladder inflation air lines pass through the tire inflation chamber exteriorly of the central shaft and are in fluid communication with the annular manifold rings.

17. The tire building drum defined in claim 16 in which the bladder inflation air supply lines which pass through the tire inflation chamber are formed of flexible tubing.

18. The tire building drum defined in claim 16 in which eight bladder inflation air lines extend between the pair of manifold rings.

19. The tire building drum defined in claim 6 in which each of the bead lock assemblies includes 36 bead lock segments.

* * * * *